United States Patent [19]

Stedman

[11] 4,147,218
[45] Apr. 3, 1979

[54] BULLDOZER ATTACHMENT FOR FOUR-TRACKED TRACTOR

[75] Inventor: Robert N. Stedman, Chillicothe, Ill.

[73] Assignee: Caterpillar Tractor Co., Peoria, Ill.

[21] Appl. No.: 837,773

[22] Filed: Sep. 29, 1977

[51] Int. Cl.² ............................................. E02F 3/76
[52] U.S. Cl. ..................................... 172/803; 180/9.5
[58] Field of Search ............................ 180/9.2 R, 9.5; 172/803, 805, 806, 807, 808, 809, 801, 804

[56] References Cited

U.S. PATENT DOCUMENTS

| | | | |
|---|---|---|---|
| 2,604,708 | 7/1952 | Washbond | 172/801 |
| 2,624,131 | 1/1953 | Rockwell | 172/807 |
| 2,775,831 | 1/1957 | Rockwell | 172/803 |
| 2,875,535 | 3/1959 | Williams | 172/254 |
| 3,175,315 | 3/1965 | Strader | 172/803 |
| 3,234,670 | 2/1966 | Fryer | 172/803 |
| 3,590,929 | 8/1971 | Wirt | 172/805 |
| 3,631,931 | 1/1972 | Frisbee | 172/807 |
| 3,773,116 | 11/1973 | Coontz | 172/804 |
| 3,889,769 | 6/1975 | Bloomstrom | 180/9.5 |
| 3,913,684 | 10/1975 | Casey | 172/804 |

Primary Examiner—Richard J. Johnson
Attorney, Agent, or Firm—Phillips, Moore, Weissenberger, Lempio & Majestic

[57] ABSTRACT

Mounting structure provides for coupling a bulldozer blade to a crawler tractor which has four track assemblies each of which may oscillate vertically independently of the others and pairs of which may oscillate laterally relative to the tractor body and which is therefore not adaptable to the coupling of bulldozer push arms to the track frames at each side of the tractor in the conventional manner. A pair of push arms with universal joints at each end extend between pairs of the track assemblies to couple the blade to suspension frame members. A mounting member, pivotable vertically by a centrally located lift cylinder, connects to the blade at another universal joint. To resist side loads, which can be severe owing to the close spacing of the push arms, stabilizing links extend diagonally from the mounting member to the ends of the blade and the links may be fluid cylinders to facilitate tipping and tilting of the blade.

10 Claims, 3 Drawing Figures

BULLDOZER ATTACHMENT FOR FOUR-TRACKED TRACTOR

BACKGROUND OF THE INVENTION

This invention relates to bulldozer attachments for tracked vehicles and more particularly to the coupling of a bulldozer blade to a crawler vehicle of the form which rides on four track assemblies each of which is capable of a degree of vertical and lateral oscillation relative to the vehicle body.

Crawler tractors and most other forms of tracked vehicle are usually provided with a pair of track assemblies each of which extends along an opposite side of the vehicle. In the conventional construction the two track assemblies may have a limited degree of freedom to oscillate or pivot vertically relative to the vehicle body to accommodate to terrain irregularities and are usually constrained against outward and inward oscillation. Most prior mounting structures for supporting a bulldozer blade at the front of such a vehicle have a pair of push arms each of which extends backward from an opposite side of the blade to connect with the track frame of a separate one of the track assemblies, usually through trunnion bearings or other forms of universal joint. Additional bracing is often provided between the back of the blade and the push arms or between the back of the blade and the vehicle body to increase resistance to loads and to provide for one or more of several forms of positional adjustment of the blade such as lifting and lowering, tipping, tilting and angling. In many instances such bracing is formed in part of extensible and contractable fluid cylinders in order to facilitate changes of blade position during operation.

The known forms of bulldozer attachment are not adaptable to certain specialized forms of crawler vehicle in which the track frames may have greater freedom of movement than is the case with the conventional two-tracked crawler vehicle. One highly advantageous form of crawler vehicle is supported on four spaced-apart essentially parallel crawler track assemblies which extend lengthwise beneath the vehicle body. Ground pressure is reduced and traction, flotation and stability are enhanced by a suspension system which allows the forward portion of each track assembly to rise and fall independently of the others to accommodate to irregular terrain. The suspension system also enables the outer and inner track assemblies below the right portion of the vehicle body to oscillate outward and inward as a unit while enabling the two track assemblies below the left side of the vehicle to oscillate outwardly and inwardly as a unit in a similar but independent manner.

Because of this novel freedom of motion of the track assemblies relative to each other and to the vehicle body, bulldozer attachment push arms cannot simply be coupled to the outermost track frames in the conventional manner without creating operational problems. Depending on the specific bulldozer attachment construction, this conventional mode of coupling may variously interfere with the oscillations of the track assemblies, or cause severe stresses and loading at certain portions of the bulldozer attachment or cause the blade to undergo undesirable positional changes as the track assemblies oscillate vertically and laterally in response to terrain irregularities.

SUMMARY OF THE INVENTION

The present invention is directed to overcoming one or more of the problems as set forth above.

According to the present invention attachment of a bulldozer blade to a four-tracked vehicle of the above-described form is accomplished without interfering with freedom of movement of individual track assemblies and pairs of track assemblies and without causing excessive shifting of blade position as track assemblies oscillate in response to terrain irregularities. Blade attachment is effected with a high-strength load-resistant mounting structure which may, if desired, provide for adjustment of blade orientation in any of a plurality of respects.

A push arm with universal joint couplings at each end extends forward to the back of the blade from each of a pair of right and left suspension frame members situated between the right and left pairs of track assemblies respectively, the points of connection of the push arms to the blade being situated inwardly from the ends of the blade. A mounting member pivoted to the vehicle body may be raised and lowered by a lift cylinder and connects to the back of the blade through a universal joint situated midway between the ends of the blade and above the couplings between the blade and the push arms. Resistance to side loads, which could otherwise be severe as a result of the location of the push arms, is provided by a pair of stabilizing links each of which extends diagonally from the mounting member to each end region of the blade.

The stabilizing links may be of adjustable length to change the orientation of the blade relative to the vehicle and in a preferred form are formed by extensible and contractable fluid cylinders to enable changes of blade orientation while the vehicle is operating.

The invention, together with further objects and advantages thereof, will best be understood by reference to the following description of a preferred embodiment taken in conjunction with the accompanying drawings.

DESCRIPTION OF A PREFERRED EMBODIMENT

Figure 1:
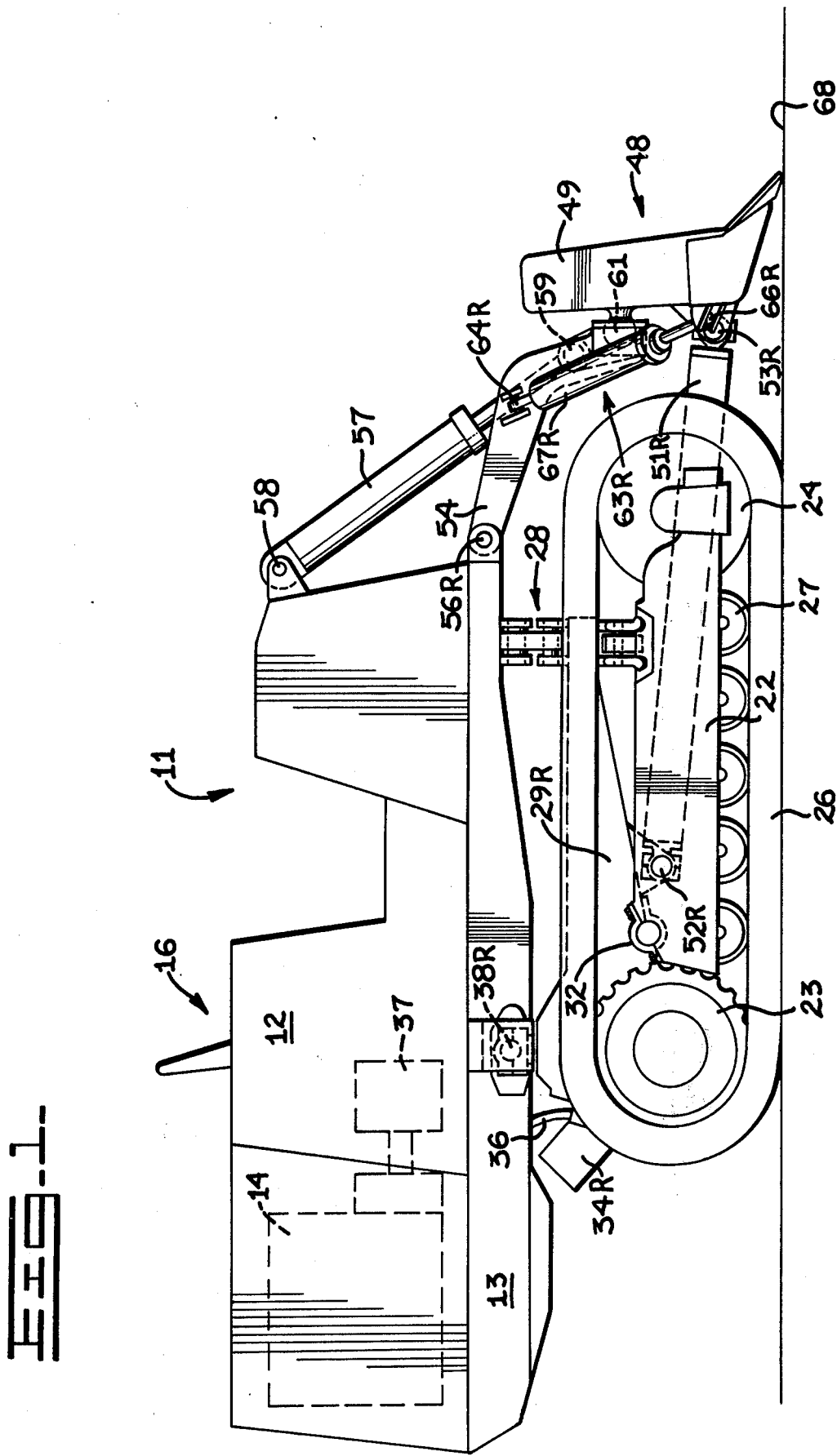
FIG. 1 is a side elevation view of a four-tracked crawler tractor equipped with a bulldozer attachment in accordance with the invention.
Figure 2:
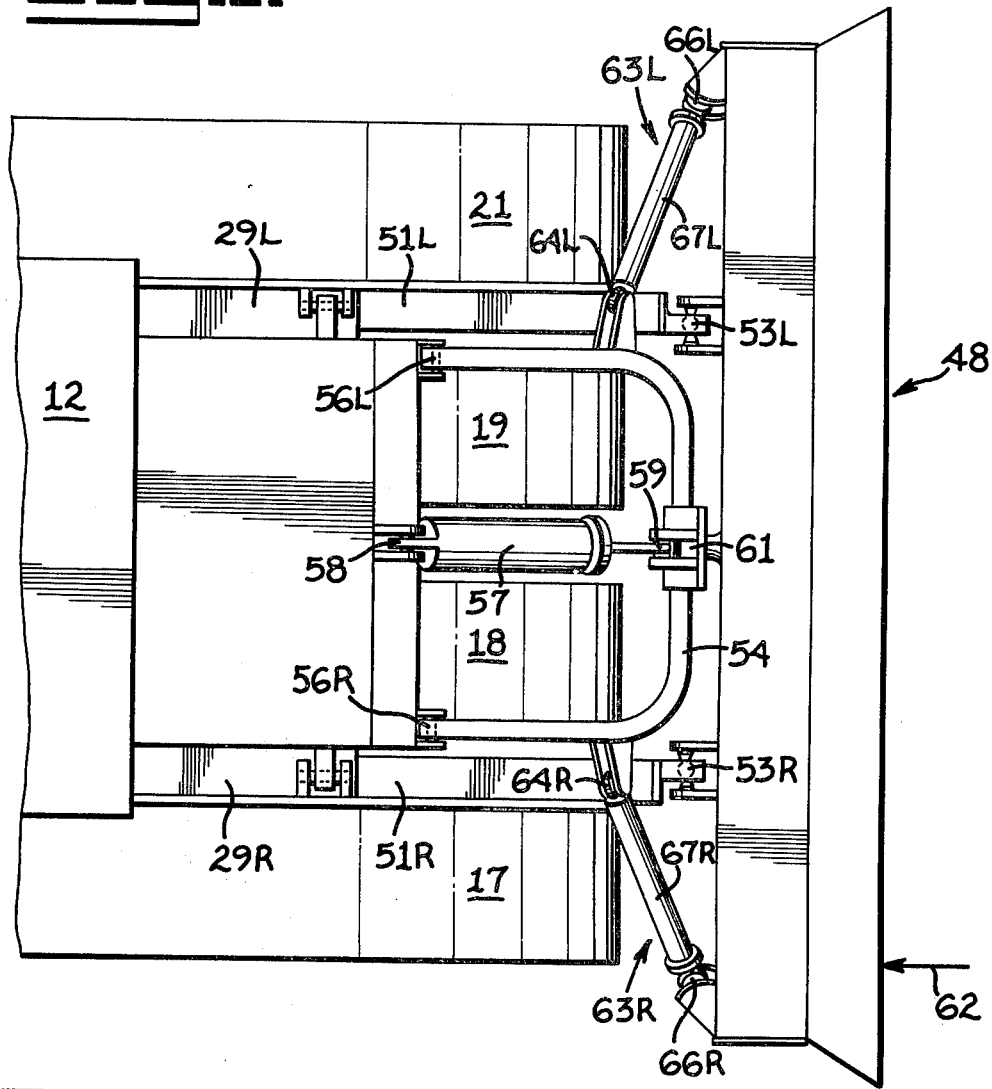
FIG. 2 is a plan view of the forward portion of the crawler vehicle of FIG. 1 including the bulldozer attachment.

Referring now to FIGS. 1 and 2 of the drawings in conjunction, there is shown a crawler vehicle 11 including a body 12 supported on a main frame 13 which also carries an engine 14 and operator's station 16. The above-described vehicle components are supported by and ride upon four separate crawler track assemblies 17, 18, 19 and 21 which are spaced apart and each of which extends lengthwise below the vehicle body.

Track assemblies 17 and 18 constitute a right-side pair situated below the right side of the vehicle body with track assembly 17 being outermost and track assembly 18 being innermost. The other two track assemblies 19 and 21 constitute a left-side pair of track assemblies situated below the left half of the vehicle body with track assembly 21 being the outer one and track assembly 19 being the inner one of the pair.

Each track assembly 17, 18, 19 and 21 may have a longitudinally extending roller frame 22, a drive sprocket 23 at the back end and an idler 24 at the forward end. An endless crawler track chain 26 is engaged on idler 24 and drive sprocket 23 and is driven by rotation of the drive sprocket. A series of track rollers 27 are journaled along the lower portion of roller frame 22 and ride on the inner surface of track chain 26 in order to distribute the weight of the vehicle along the track.

Each of the four track assemblies 17, 18, 19 and 21 is coupled to the main frame 13 of the vehicle through a suspension system 28 which enables the forward and central portion of each track assembly to pivot upwardly or downwardly relative to the vehicle body independently of each of the other track assemblies to accomodate to terrain irregularities. The suspension system 28 further enables the right-side pair of track assemblies 17 and 18 to swing laterally outward and inward as a unit relative to the vehicle body while enabling the left-side pair of track assemblies 19 and 21 to oscillate laterally as a unit but independently of the right-side pair of track assemblies.

Figure 3:
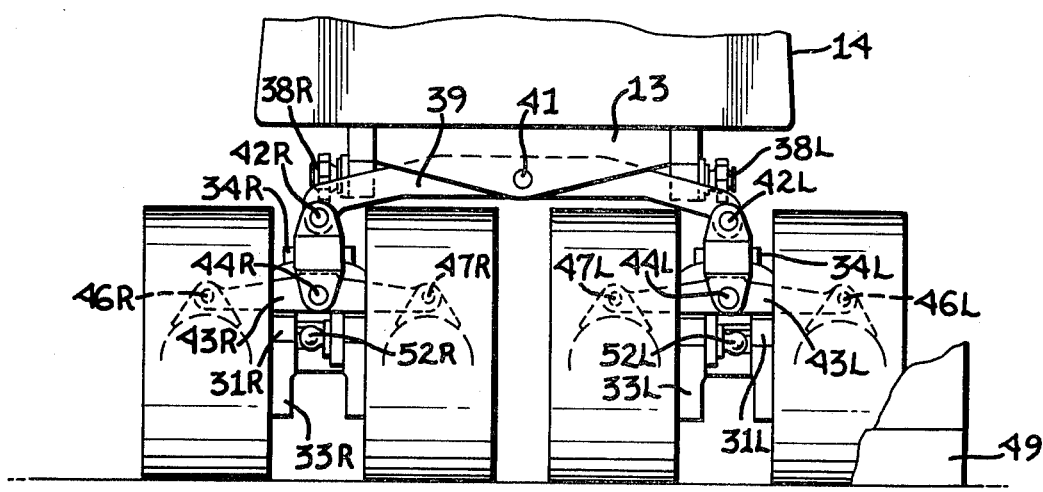
FIG. 3 is a front view of the tractor of FIG. 1 with portions of the bulldozer attachment broken out.

To enable these forms of track adjustment to varying terrain, the suspension system 28 includes right and left suspension frame members 29R and 29L respectively. Right suspension frame member 29R extends lengthwise of the vehicle between the right pair of track assemblies 17 and 18 while the left suspension frame member 29L is similarly positioned between the left pair of track assemblies 19 and 21. Referring now to FIG. 3 in conjunction with FIG. 1, a right cross-shaft 31R extends laterally from right suspension frame member 29R to pivotably couple the back ends of the roller frame 22 of the two right-side track assemblies 17 and 18 to the right suspension frame member through pivot joints 32 shown in FIG. 1. Thus the forward and central portion of each right-side track assembly 17 and 18 may oscillate upward or downward about pivot joint 32 as dictated by the underlying terrain. The back portions of the track assemblies do not oscillate in this manner as the drive sprocket 23 of each of the right-side track assemblies is journaled to the back end of right-side suspension frame member 29R through final drive housings 33R which transmit drive to both sprockets from a single hydraulic motor 34R mounted at the back end of the right-side suspension frame member 29R. Pressurized driving fluid is transmitted to hydraulic motor 34, through a flexible hose 36 from a pump 37 driven by engine 14.

The left-side track assemblies 19 and 21 are similarly coupled to left-side suspension frame member 29L through a cross-shaft 31L and drive from a left-side hydraulic motor 34L is transmitted to each of the left-side track assemblies through final drive housings 33L carried on the back end of the left-side suspension frame member.

The back ends of each suspension frame member 29R and 29L are coupled to main frame 13 through ball and socket joints 38R and 38L respectively. This mode of attachment enables the suspension frame members 29 to pivot upwardly and downwardly and also enables each pair of track assemblies to swing outwardly and inwardly relative to the vehicle body under conditions where the underlying terrain slopes in a direction transverse to the direction of travel of the vehicle.

The portion of the suspension system 28 described above serves to couple the four track assemblies to the main frame 13 while enabling the independent and semi-independent forms of vertical and lateral oscillation described above. In order to support the vehicle body on the track assemblies, front coupling means must also be provided between the track roller frames 22 and suspension frame member 29 and between the suspension frame members and the main frame 13 and the front coupling means must be capable of accommodating to the track motions described above. For this purpose a primary doubletree member 39 extends transversely below the vehicle body 14 and is coupled to the forward end of main frame 13 by a pivot joint 41 situated midway between the sides of the main frame. Pivot joint 41 enables pivoting of the primary doubletree member 39 about a longitudinal axis situated midway between the sides of the vehicle. The term doubletree is herein used to designate certain members of the suspension system because of resemblances to the doubletree or whiffletree hitches used to couple a plurality of draft animals to an animal-drawn wagon.

The right end of primary doubletree member 39 is coupled to the forward end of right suspension frame member 29R by still another pivot joint 42R while the left end of member 39 is similarly coupled to the front end of left suspension frame member 29L by a similar pivot joint 42L, pivot joints 42 both having pivot axes extending lengthwise of the vehicle.

The front end of right suspension frame member 29R is in turn coupled to the forward portion of the roller frame 22 of each of the right-side track assemblies 17 and 18 by a right secondary doubletree member 43R. The center of member 43R is coupled to the forward end of suspension frame member 29R through a pivot joint 44R situated below pivot joint 42R. The outer end of secondary doubletree member 43R is coupled to roller frame 22 of the outer right-side track assembly 17 through a pivot joint 46R while the inner end of the same member is coupled to the roller frame 27 of the inner right-side track assembly 18 through still another pivot joint 47R, the pivot axes of joints 46R and 47R being parallel to those of pivot joints 41, 42R and 44R.

The front ends of the roller frames 22 of the two left-side track assemblies 19 and 21 are similarly coupled to the front end of the left-side suspension frame member 29L through a left secondary doubletree member 43L and pivot joints 44L, 46L and 47L which are similar to the corresponding components at the right side of the vehicle as described above.

Referring again to FIGS. 1 and 2 in conjunction, the present invention provides a bulldozer attachment 48 suitable for use with a four-tracked crawler vehicle of the above-described form. Bulldozer attachment 48 may have a blade 49 of any suitable known construction except insofar as specialized adaptations are present for coupling the blade to the associated vehicle 11. In particular, blade 49 couples to vehicle 11 through a right push arm 51R and left push arm 51L which are spaced apart a distance less than the length of the blade so that push arm 51R may extend backward from the blade between the right-side pair of track assemblies 17 and 18 for coupling to right suspension frame member 29R by means of a first ball-and-socket joint 52R or other universal joint form of coupling of the type which enables pivoting movement in orthogonal directions. Similarly, the left push arm 51L extends backward from a position approximately midway between the center and left end of the blade 49 to couple to the left suspension frame member 29L at a second universal joint 52L which is of the ball-and-socket form in this example. Right and left push arms 51R and 51L respectively couple to the back of blade 49 through third and fourth universal joints 53R and 53L respectively which are situated at intermediate points between the center of the blade and the right and left ends thereof respectively and at the lower portion of the back of the blade.

An additional mounting member 54 of U-shaped configuration is situated between the push arms 51 and above the level of the push arms and has opposite ends which couple to the body 12 of the vehicle at pivot joints 56R and 56L to enable the forward portion of the mounting member to be raised and lowered by means of a fluid-operated lift cylinder 57 which has an upper end coupled to vehicle body 12 through a pivotable coupling 58 situated above and equidistantly from the mounting member pivot joints 56R and 56L. Lift cylinder 57 extends forward and downward from pivot coupling 58 with the rod end of the cylinder being coupled to the center of the forward portion of mounting member 54 through another pivot coupling 59. Thus extension of the lift cylinder 57 swings the mounting member 54 downward while retraction of the cylinder raises the mounting member.

A fifth universal joint 61 of the ball-and-socket form couples the back of blade 49 to the forward center of mounting member 54 at a location above and equidistant from universal joints 53R and 53L.

In theory, the blade mounting structure as described to this point provides for full support of the blade at the front of the vehicle since, assuming that lift cylinder 57 is immobilized, the blade is coupled to the vehicle at three non-colinear points defined by the third, fourth and fifth universal joints 53R, 53L and 61. As a practical matter, any looseness in the pivot couplings 56R and 56L which connect mounting member 54 to the vehicle body would tend to allow an undesirable degree of distortion of the bulldozer attachment. Still further, the unusual disposition of the push arms 51 relative to the blade dictated by the above-described construction, in which the push arms necessarily connect to the back of the blade at locations distant from the side portions of the blades, might require an unusually massive blade construction to resist possible side loads. Side loads occur when a side region of the blade encounters a high degree of resistance as the vehicle and blade push against a load. Thus a force acting, for example, against the right side of blade 49 as indicated by arrow 62 tends to deflect the blade and to create severe stresses at certain of the joints in the mounting structure. To relieve these problems, in part by increasing resistance to side loads, right and left stabilizing links 63R and 63L are connected between the right and left sides of mounting member 54 and extend downward and forward to connect with the right and left lower corners respectively of the back of the blade. Right stabilizing link 63R may have an upper end coupled to mounting member 54 at a pivot coupling 64R and may have a lower forward end coupled to the base of the right end of the blade at a universal joint 66R of the ball-and-socket form. Similarly the left stabilizing link 63L may have an upper back end coupled to the other side of mounting member 54 at a pivot coupling 64L and a lower forward end coupled to the lower left corner of the back of the blade at a universal joint 66L.

Stabilizing links 63R and 63L may be rigid links in instances where the bulldozer blade 49 is always to be maintained in the same orientation at the front of the vehicle 11 aside from being raisable and lowerable by operation of lift cylinder 57. In some working situations, it is preferable to be able to change the orientation of the blade in other respects and this may be facilitated by utilizing stabilizing links 63 which are of adjustable length. In the present example, the stabilizing links 63R and 63L are extensible and contractable fluid cylinders 67R and 67L respectively as this form of adjustability enables changes of blade orientation to be accomplished extemely easily and while the apparatus is in actual operation.

By selective operation of the stabilizing link cylinders 67R and 67L, assisted by lift cylinder 57 in some instances, adjustments in both the tip and tilt of the blade 49 may readily be effected. Referring to FIG. 1, tip refers to the angle which the blade 49 forms with the surface 68 along which the blade travels when the blade is viewed in profile as depicted in FIG. 1. In order to adjust the tip of the blade 49, lift cylinder 57 may be temporarily placed in a float condition at which it may freely extend or contract in response to external forces and the two stabilizing link cylinders 67R and 67L are then operated in unison. Synchronized extension of the stabilizing link cylinders 67R and 67L under this condition swings mounting member 54 upward and shifts universal joint 61 upward and forward to increase the tip of the blade. Synchronized contraction of the cylinders 67R and 67L pulls universal joint 61 downward and backward decreasing the tip of the blade. When a desired blade tip angle is reached, cylinders 67 are immobilized and lift cylinder 57 is shifted from a float position to the hold position at which it stops any further pivoting motion of mounting member 54.

The tilt of the blade 49 is defined as the angle which the blade forms with respect to surface 68 when viewed from the front or along the direction of travel of the vehicle. Control of tilting of blade 49 may be accomplished by extending one of the stabilizing link cylinders 67 while synchronously contracting the other. Thus extension of the right stabilizing link cylinder 67R accompanied by contraction of the left stabilizing link cylinder 63L lowers the right end of the blade while raising the left end, while reversed motion of the cylinders 67 tilts the blade in an opposite sense.

While the invention has been decribed with respect to a single preferred embodiment, it will be apparent that many modifications are possible and it is not intended to limit the invention except as defined in the following claims.

The embodiments of the invention in which an exclusive property or privilege is claimed are defined as follows:

1. A bulldozer attachment for a crawler vehicle which has a body riding on four side-by-side track assemblies wherein the right-side pair of said track assemblies are coupled to said body through a right suspension frame member situated between said right-side pair of track assemblies and wherein a left-side pair of said track assemblies are coupled to said body through a left suspension frame member situated between said left-side pair of track assemblies, comprising:
   a bulldozer blade having a right-side portion and a left-side portion,
   right and left push arms extending backward from said blade and respectively having first and second universal coupling means at the back ends for coupling to said right and left suspension frame members respectively, and having third and fourth universal coupling means for coupling the forward ends of said right and left push arms respectively to the back of said blade at intermediate locations thereon which are spaced inwardly from said right- and left-side portions respectively of said blade, a mounting member having a forward end coupled to the back of said blade by fifth universal coupling means situated equidistantly from said third and fourth universal coupling means and above the level thereof, said mounting member having pivot means at the back end for pivotable attachment to said vehicle body to enable vertical pivoting movement of said mounting member, a lift cylinder connected to said mounting member and having means for connection to said vehicle body, and right and left stabilizing links coupled between said mounting member and said right- and left-side portions respectively of said blade.

2. The combination defined in claim 1 wherein said mounting member is of U-shaped configuration with the base portion being adjacent said blade and coupled thereto by said fifth universal coupling means and with said pivot means for attachment to said vehicle body being at the ends thereof which are remote from said blade.

3. The combination defined in claim 2 wherein said right and left stabilizing links extend downwardly and forwardly and outwardly from the right and left sides respectively of said U-shaped mounting member and are respectively coupled to said blade at the lower corners of said right- and left-side portions thereof.

4. The combination defined in claim 1 wherein said right and left stabilizing links are coupled to said mounting member by sixth and seventh universal couplings respectively and are coupled to said blade by seventh and eighth universal couplings respectively.

5. The combination defined in claim 1 wherein said fifth universal coupling means is equidistant from said third and fourth universal coupling means and from said right- and left-side portions of said blade.

6. The combination defined in claim 5 wherein said third and fourth universal coupling means are situated adjacent the lowermost portion of the back of said blade.

7. The combination defined in claim 1 wherein said right and left stabilizing links are respectively defined at least in part by right and left extensible and contractable fluid cylinders.

8. The combination defined in claim 7 wherein each of said fluid cylinders is coupled to said mounting member and to said blade by additional universal coupling means.

9. The combination defined in claim 1 wherein said lift cyliner is situated midway between said end portions of said blade and wherein the front end of said lift cylinder is coupled to said mounting member at said fifth universal coupling means.

10. The combination defined in claim 1 wherein said mounting member has a forward portion extending parallel to said blade and backwardly extending right and left arms at the right and left ends respectively of said forward portion, and wherein said right stabilizing link is a right fluid cylinder extending from said right arm to the right lower corner of the back of said blade, and said left stabilizing link is a left fluid cylinder extending from said left arm to the left lower corner of the back of said blade.

* * * * *